(12) United States Patent
Filbin et al.

(10) Patent No.: US 10,897,537 B1
(45) Date of Patent: Jan. 19, 2021

(54) SYSTEMS AND METHODS FOR TRIAGING HIGH RISK MESSAGES

(71) Applicant: Crisis Text Line, Inc., New York, NY (US)

(72) Inventors: Bob Filbin, New York, NY (US); Ankit Gupta, New York, NY (US); Keith Morris, New York, NY (US)

(73) Assignee: Crisis Text Line, Inc., New York, NY (US)

( * ) Notice: Subject to any disclaimer, the term of this patent is extended or adjusted under 35 U.S.C. 154(b) by 0 days.

(21) Appl. No.: 16/752,396

(22) Filed: Jan. 24, 2020

Related U.S. Application Data (63) Continuation of application No. 16/748,489, filed on Jan. 21, 2020.

(60) Provisional application No. 62/891,834, filed on Aug. 26, 2019.

(51) Int. Cl.

| | | |
|---|---|---|
| *H04M 3/51* | (2006.01) | |
| *H04M 3/42* | (2006.01) | |
| *H04M 3/523* | (2006.01) | |
| *H04L 12/58* | (2006.01) | |
| *H04M 3/493* | (2006.01) | |
| *H04W 4/90* | (2018.01) | |
| *H04M 3/436* | (2006.01) | |

(52) U.S. Cl.
CPC .......... *H04M 3/5116* (2013.01); *H04L 51/02* (2013.01); *H04M 3/42382* (2013.01); *H04M 3/4365* (2013.01); *H04M 3/4933* (2013.01); *H04M 3/5232* (2013.01); *H04M 3/5237* (2013.01); *H04W 4/90* (2018.02)

(58) Field of Classification Search
CPC .... G06Q 50/265; H04M 3/51; H04M 3/5116; H04M 3/5232; H04M 3/523; H04M 3/42382; H04M 3/5237; H04M 3/4933; H04M 3/4365; H04W 4/90; H04W 76/50; H04W 4/14; H04W 4/08; H04W 4/12; H04L 51/02; H04L 51/04
See application file for complete search history.

(56) References Cited

U.S. PATENT DOCUMENTS

| | | | |
|---|---|---|---|
| 2014/0044246 A1* | 2/2014 | Klemm | H04M 3/42068 379/93.01 |
| 2018/0077088 A1* | 3/2018 | Cabrera-Cordon | G06N 20/00 |
| 2019/0052584 A1* | 2/2019 | Barve | H04L 51/02 |

\* cited by examiner

*Primary Examiner* — Nam T Huynh
(74) *Attorney, Agent, or Firm* — Crowell & Moring LLP (57) ABSTRACT

Systems and methods for automated triaging of electronic communications within a server system that associates user devices with counselor devices, include receiving a plurality of electronic messages from the user devices. The systems and methods also include associating electronic messages with respective conversations, each conversation having an associated user device and one or more associated electronic messages. The systems and methods also include determining content of the electronic messages of each conversation. The systems and methods also include calculating a risk score for each conversation based on the determined content of the associated electronic messages. The systems and methods also include assigning a priority to each conversation based on the risk score for the conversation. The systems and methods also include associating counselor devices with conversations based on the priority assigned to the conversation.

18 Claims, 6 Drawing Sheets

SYSTEMS AND METHODS FOR TRIAGING HIGH RISK MESSAGES

CROSS-REFERENCE TO RELATED APPLICATIONS

This application is a continuation of U.S. patent application Ser. No. 16/748,489 filed on Jan. 21, 2020, which claims priority to U.S. Provisional Application No. 62/891,834, filed on Aug. 26, 2019, the disclosure of which is hereby incorporated by reference in its entirety.

FIELD OF THE INVENTION

The disclosure relates generally to systems and methods for automated triaging of text messages, or other electronic communications, according to an evaluated level of risk of physical or psychological harm related to a sender of the text message.

BACKGROUND OF THE INVENTION

Data released from the World Health Organization and Centers for Disease Control and Prevention reveal increasing rates of depression and suicide across the United States and globally. The lack of good mental health care, as well as difficulty accessing affordable and effective resources and treatments, pose a serious threat to society. With the advent of social media, the public can connect with friends and family at an unprecedented scale and yet become increasingly disconnected emotionally from those friends and family, as well as society at large. The increased costs and lingering social stigmas associated with seeking mental health treatment may also serve as additional obstacles to those suffering, particularly to children and young adults, who are often reliant on the involvement of a parent or school official to obtain help.

It has also been observed that cellular phone users, and especially younger people, increasingly communicate via text messaging rather than by phone call. As used herein, the term "text messaging" is understood as any electronic communication by which real-time or nearly real-time communication is intended. Such real-time or nearly real-time communication is distinguished from other electronic communication, such as for example e-mail, and includes but is not limited to: short-message-service (SMS), iMessage™, and social media or other cross-platform messaging applications.

Crisis hotlines provide a safe, confidential and anonymous resource for individuals to seek immediate help during times of emotional crisis. In operation, a user dials a number or submits a text message to a crisis hotline provider—and waits for a response from a counselor or administrator associated with the crisis hotline.

It is problematic, however, that users of crisis hotlines are generally responded to in a location-based first-come-first-served order. In other words, responders are assigned to a geographic region, and respond only to users in their assigned region on a first-come-first-served basis. This approach is problematic because significant harm (and even death) may occur when a user in urgent crisis is not timely responded to by a trained crisis counselor. Such systems pose serious risks to users in crisis.

Systems and methods are therefore needed, which automatically prioritize users contacting a crisis hotline system in accordance with an evaluated level of risk to each user, respectively.

SUMMARY OF THE INVENTION

The disclosure provides for systems and methods that automatically prioritize users contacting a crisis hotline system in accordance with an evaluated level of risk to each user, respectively.

Systems and methods for automated triaging of electronic communications within a server system that associates user devices with counselor devices, include receiving a plurality of electronic messages from the user devices. The systems and methods also include associating electronic messages with respective conversations, each conversation having an associated user device and one or more associated electronic messages. The systems and methods also include determining content of the electronic messages of each conversation. The systems and methods also include calculating a risk score for each conversation based on the determined content of the associated electronic messages. The systems and methods also include assigning a priority to each conversation based on the risk score for the conversation. The systems and methods also include associating counselor devices with conversations based on the priority assigned to the conversation.

Other features and advantages will become apparent from the following more detailed description, taken in conjunction with the accompanying drawings, which illustrate, by way of example, the principles of the presently disclosed invention.

DETAILED DESCRIPTION OF THE PREFERRED EMBODIMENTS

The above described drawing figures illustrate the disclosed invention in at least one of its embodiments, which invention is further defined in detail in the following description. Those having ordinary skill in the art may be able to make alterations and modifications to the invention described herein without departing from its spirit and scope. While the invention is susceptible of embodiment in many different forms, there is shown in the drawings and will herein be described in detail at least one preferred embodiment of the invention, with the understanding that the disclosure is to be considered as an exemplification of the principles of the invention and is not intended to limit the broad aspect of the invention to the embodiments illustrated. Therefore, it should be understood that what is illustrated is set forth only for the purposes of example and should not be taken as a limitation on the scope of the present invention.

Figure 1:
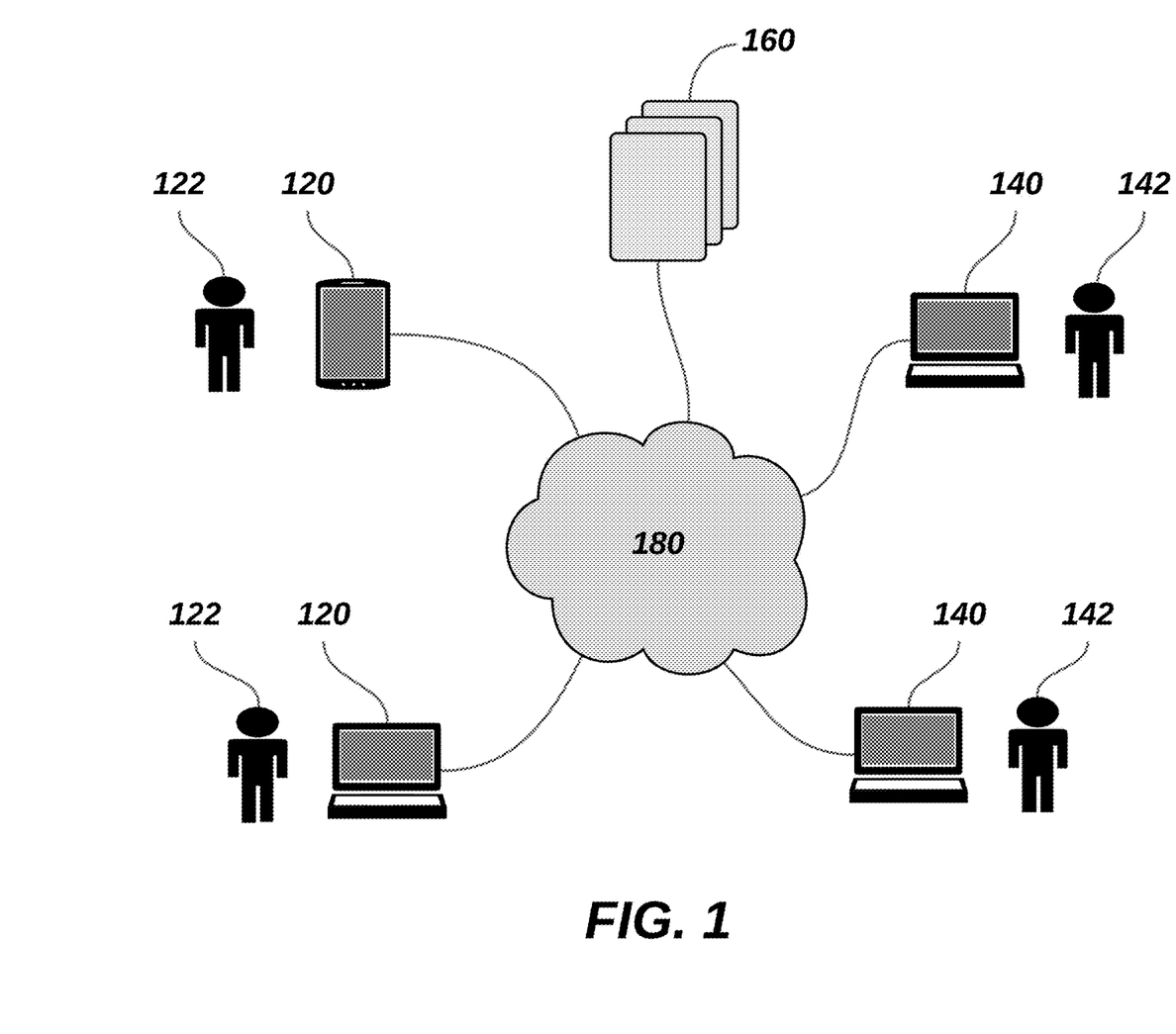
FIG. 1 schematically illustrates a system in accordance with one or more aspects of the invention.

FIG. 1 illustrates an example system 100 in accordance with one or more aspects of the disclosure. The system may represent at least a portion of an IT environment of a crisis hotline service provider, which is configured to automatically prioritize users contacting the crisis hotline provider in accordance with an evaluated level of risk to each user.

The system may include one or more user devices 120, each respectively associated with a user 122, one or more counselor devices 140, each respectively associated with a counselor or other administrator 142, a crisis line server system 160, and a network 180 that operatively couples the components of the system.

The crisis line server system may include a plurality of computers and/or computing devices, such as server computers and storage devices. The server computers may include one or more processors, memories, interfaces, and/or displays, and may be configured to communicate with other system components via the network. The server computers may be rack mounted on a network equipment rack and/or located, for instance, in a data center. In one example, the server computers may use the network to serve the requests of programs executed on counselor devices, user devices, and/or storage devices.

The storage devices may be configured to store large quantities of data and/or information. For example, the storage devices may be a collection of storage components, or a mixed collection of storage components, such as ROM, RAM, hard-drives, solid-state drives, removable drives, network storage, virtual memory, cache, registers, etc. Each storage device may also be configured so that other components of the system may access it via the network.

The counselor device and the user device may each include different types of components associated with a computer and/or computing device, such as one or more processors, memories, instructions, data, displays, and interfaces—and may be configured to communicate with other components of the system via network. The devices may be mobile (e.g., laptop computer, tablet computer, smartphone, PDA, etc.) or stationary (e.g., desktop computer, etc.).

The processor may instruct the components thereof to perform various tasks based on the processing of information and/or data that may have been previously stored or have been received, such as instructions and/or data stored in the memory. The processor may be a standard processor, such as a central processing unit (CPU), or may be a dedicated processor, such as an application-specific integrated circuit (ASIC), or a field programmable gate array (FPGA).

The memory stores at least instructions and/or data that can be accessed by the processor. For example, the memory may be hardware capable of storing information accessible by the processor, such as a ROM, RAM, hard-drive, CD-ROM, DVD, write-capable, read-only, etc. The set of instructions may be included in software that can be implemented on the respective device. It should be noted that the terms "instructions," "steps," "algorithm," and "programs" may be used interchangeably. Data can be retrieved, manipulated or stored by the processor in accordance with the set of instructions or other sets of executable instructions. The data may be stored as a collection of data.

The display may be any type of device capable of communicating data to a user, such as a liquid-crystal display ("LCD") screen, a plasma screen, etc. The interface allows the counselor or other administrator to communicate with the device—and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The network may be any type of network, wired or wireless, configured to facilitate the communication and transmission of data, instructions, etc. from one component to another component of the network. For example, the network may be a local area network (LAN) (e.g., Ethernet or other IEEE 802.03 LAN technologies), Wi-Fi (e.g., IEEE 802.11 standards, wide area network (WAN), virtual private network (VPN), global area network (GAN), any combination thereof, or any other type of network.

It is to be understood that the network configuration illustrated in FIG. 1 serves only as an example and is thus not limited thereto. The system, for instance, may include numerous other components connected to the network, may include more than one of each network component, may be connected to other networks, and may comprise multiple interconnected networks.

Figure 2:
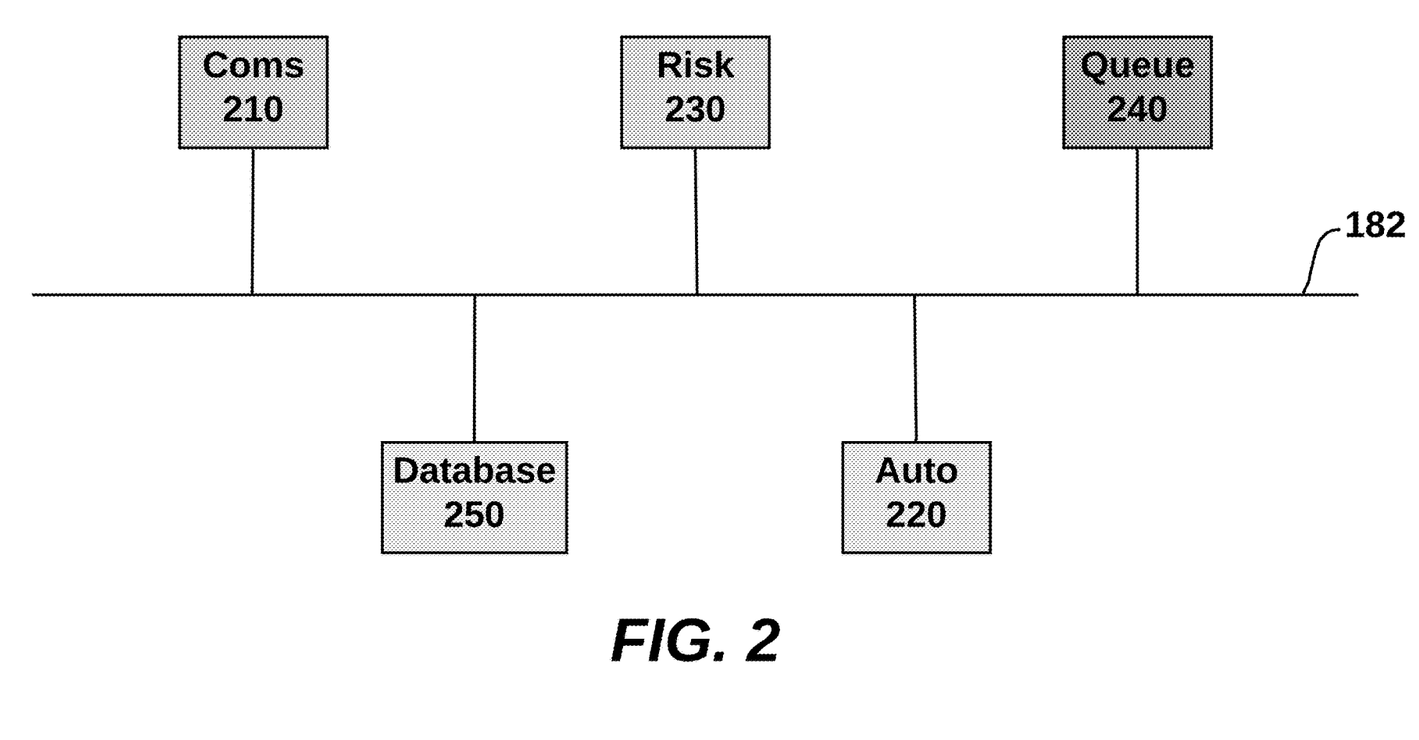
FIG. 2 schematically illustrates a system architecture in accordance with one or more aspects of the invention.

FIG. 2 illustrates one embodiment of system architecture 200 for providing a crisis hotline service provider that automatically prioritizes users contacting the crisis hotline provider in accordance with an evaluated level of risk to each user. In general, the system architecture maintains a queue of text message conversations that are prioritized according to an associated dynamic risk indicator generated via an artificial intelligence model trained with historical conversations.

The system architecture includes a communications module 210, an auto-response module 220, a risk assessment module 230, a queue management module 240, and a database 250, each operatively and communicatively coupled via system network 182. Each module may include one or more software components or parts of programs that include one or more routines or sub-routines that, when executed by one or more computers, implement the operations described herein with reference to the specific module. Each module may also, in whole or in part, comprise one or more web-applications, including attendant web-servers and databases, which implement the operations described herein.

The communications module is generally configured to establish and maintain an operative communication link between user devices and the crisis line server system, as well as between user devices and counselor devices, via the crisis line server system, in accordance with the principles discussed herein. As such, the communications module operates as an intermediary between the crisis line server system and/or counselor devices, at one end, and the user devices, at the other end.

In at least one embodiment, the communications module is configured to receive electronic communications ("e-coms") 410, including text and/or voice messages, from the user devices and the counselor devices via the network, and to manage e-coms relayed by the communications module between the user devices, counselor devices and the crisis line server system. The e-coms may be received directly and/or indirectly via a service provider, e.g., cellular service providers, social media and web-communication platforms, and other messaging platforms. Accordingly, the communications module may utilize existing messaging platforms and platform technologies, including but not limited to Twilio, Facebook, Kik, and WhatsApp.

The communications module may associate one or more e-coms with an electronic conversation 420 such that the conversation forms a record of e-coms received from and/or sent to the user device. The conversation may in turn be stored in the database in association with the user device sending and/or receiving the e-coms forming the conversation. In some embodiments, the conversation may also be associated with the device(s) sending and/or receiving the e-coms forming the conversation.

Figure 4:
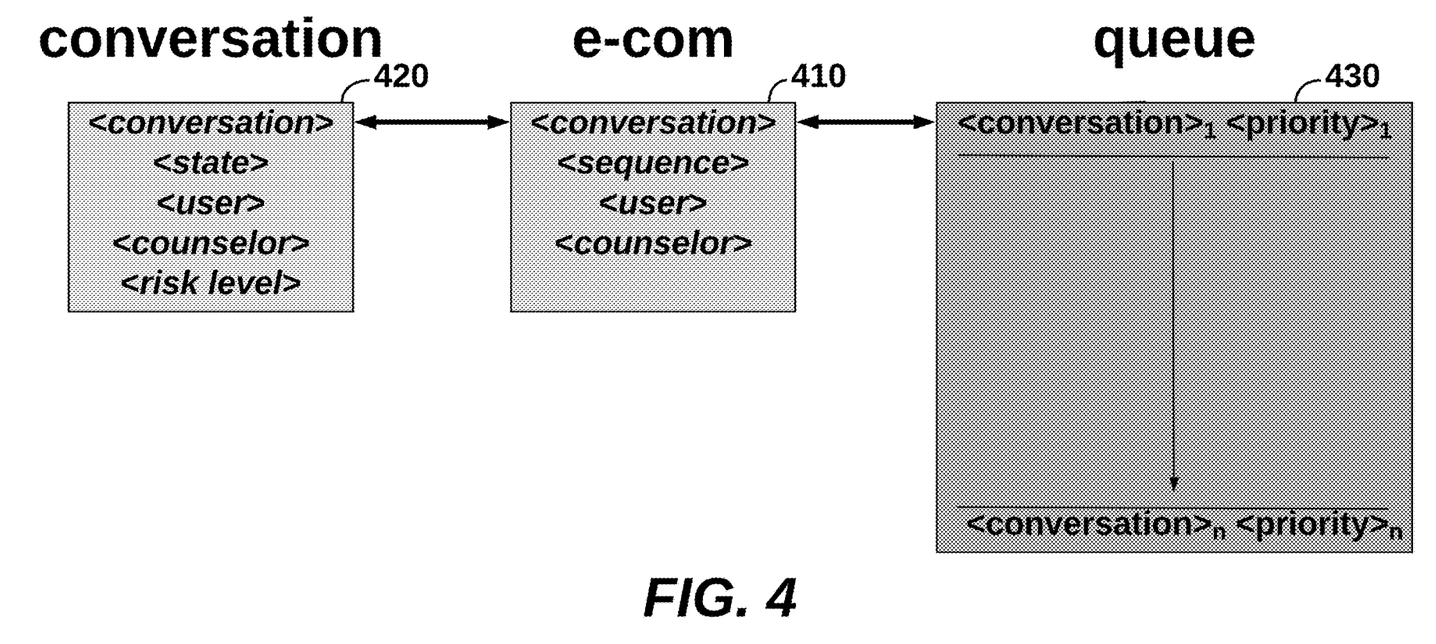
FIG. 4 schematically illustrates exemplary electronic communications, conversations and queues in accordance with one or more aspects of the invention.

As shown, for example in FIG. 4, each conversation may be a data object comprising a conversation identifier <conversation> that uniquely identifies the conversation, e.g., by number, and a state identifier <state> that identifies whether the conversation is open or closed. The conversation data object may further comprise a user identifier <user> that identifies the user device associated with the e-com. This user identifier may be, for example, any identifier used by the messaging service provider to identify a message sender, e.g., a telephone number. The conversation data object may similarly comprise one or more counselor identifiers <counselor> that identify one or more counselor devices associated with the conversation. Accordingly, the communications module may be configured to identify user and/or counselor devices sending e-coms. The conversation data object may further comprise a risk level identifier <risk> that identifies an associated risk level for the conversation. The risk level may be a quantitative indicator of the imminence and/or extent of physical and/or psychological harm to the user and/or third parties by the user.

The e-coms may also be stored as data objects, each comprising the conversation identifier of the conversation to which it is associated, the text/voice content of the e-com, and a sequence identifier <sequence> that indicates the order in which the e-com was received relative to other e-coms of the conversation. The sequence identifier may be, for example, a timestamp. The e-com may also include one or more of the other fields discussed above with reference to the conversation.

The communications module may be further configured to open conversations upon receiving initial e-coms from user devices. The communications module may store the conversations in the database, and may update the database so that additional e-coms are associated with open conversations.

In exemplary operation, the communications module may receive an e-com from a user device. The communications module may, using the user identification of the first user device, query the database to determine whether an open conversation (i.e., state=open) exists that is associated with the user identification of the first user device. If no open conversation is found, the communications module may create a new open conversation, which may be saved to the database. The communications module may then store the e-com to the database in association with the now open conversation. If an open conversation is found, a new open conversation need not be created, and the communications module may store the e-com to the database in association with the existing open conversation. Similar operation may be had for e-coms originating from counselor devices. In this manner, conversations are created and stored from e-coms.

The communications module may further be configured to associate conversations with one or more counselor identifiers, and therefore with one or more counselor devices. In operation, where a conversation is associated with a counselor identifier, the communications module may be configured to route e-coms of a conversation to the associated counselor devices based on the counselor identifiers associated with the conversation. Similarly, the communications module may be configured to route e-coms of the conversation to the associated user devices based on the user identifiers associated with the conversation.

On receipt of an e-com and upon identification of an associated open conversation (whether new or existing), the communication module may determine whether the conversation is associated with a counselor via reference to the counselor identifier. If a null counselor identifier is identified, then the conversation is not associated with a counselor. The e-com is then stored in the database and periodic checks are made to determine whether a counselor identifier has been assigned to the conversation. When a non-null counselor identifier is identified, the communications module may route the e-com to the counselor device based on the counselor identifier.

The communications module may further be configured to perform periodic checks of open conversations to determine whether an associated e-com has been received within a threshold period—and to update the state of the conversation to closed where no e-com has been received within the threshold period. The communications module may further be configured to close conversations upon receiving instructions from associated user and/or counselor devices. Such instructions may include, for example, data indicating that the user and/or counselor has exited the conversation, e.g., by closing a user interface window, disconnecting from the system, or otherwise opting-out of further communications.

Closed conversations may be stored in the database along with their associated e-coms. Accordingly, the database may contain a record, for each conversation, of historical risk levels, dynamic priority numbers, associated counselor devices, whether an active rescue was initiated, etc. This data may be in turn utilized by the risk assessment module for training, as discussed herein. Closed conversations may be automatically deleted after a holding period.

In this manner, the communications module creates, manages and stores a plurality of device-associated conversations. The communications module may also be configured to communicate with the risk assessment module so as to provide the risk assessment module with the conversation, in whole or in part, for dynamic risk assessment, as described herein.

The queue management module is configured to manage a queue 430 of open conversations not currently assigned to a counselor (i.e., the conversation has an open <status> and a null <counselor>).

An exemplary queue is shown, for example, in FIG. 4, as an updateable reference table of the database. As such, the queue may comprise a record of currently open conversations not currently assigned to a counselor, which recorded conversations are referred to herein as queued conversations. Each queued conversation may be identified by its conversation identifier <conversation> and a dynamic priority number <priority>. The queue management module may add/remove conversations to/from the queue based on their open/closed status and/or their counselor association status.

Figure 3A:
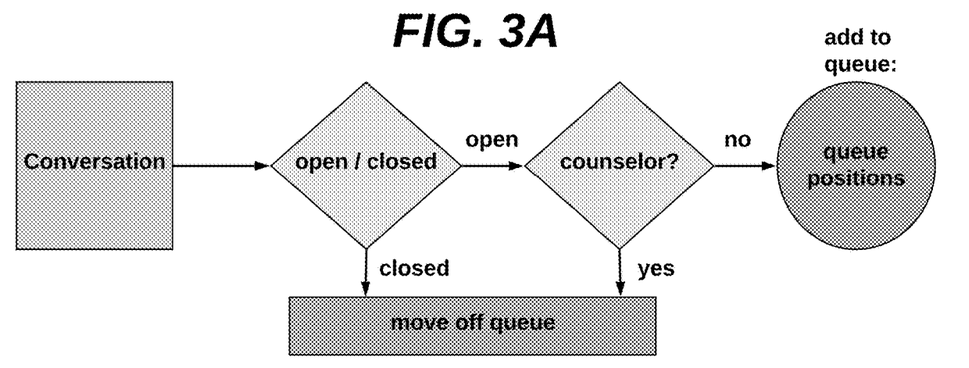
FIG. 3A schematically illustrates an exemplary operation in accordance with one or more aspects of the invention.

Turning now to FIG. 3A, in exemplary operation, the queue management module may consider whether to add/remove conversations to/from the queue. Accordingly, the status of the conversation may be thus considered. If the conversation is closed, the closed conversation may be removed from the queue (or otherwise not added). If the conversation is open, it may be considered whether the conversation is currently assigned to a counselor. If so, the conversation may be removed from the queue (or otherwise not added). If not, the conversation may be added to the queue (or otherwise not removed).

The consideration of whether to add/remove conversations to/from the queue may be made periodically, on-demand, and/or on the occurrence of a triggering event. For example, the queue management module may consider whether to add new conversations to the queue. The queue management module may further periodically audit queued conversations to consider whether to remove any queued conversations from the queue.

The queue management module may further instruct the communications module to assign counselor devices, via their counselor identifiers, to open conversations. In exemplary operation, as shown in FIG. 3C, the queue management module may periodically query the counselor devices to determine an available counselor device—i.e., a counselor device that is available to be associated with an open conversation. Alternatively, available counselor devices may affirmatively communicate with the queue management module their available status to engage an open or queued conversation. Available counselor devices may be those that are not currently associated with an open conversation, or those where a counselor is available to take additional conversations beyond the open conversation or conversations already engaged by the counselor.

Where the queue management module determines that a counselor device is available, the queue management module may instruct the communications module to assign the available counselor device to the open conversation. Such instruction may include communicating the conversation identifier to the communications module.

In some embodiments, the queue management module (or alternatively the communications module on instruction from the queue management module) may send an assignment request to available counselor devices. The assignment request may be associated with a queued conversation that is to be assigned to an available counselor. If accepted by the counselor via the counselor device, the assignment request may authorize the assignment of the queued conversation to the counselor device.

In some embodiments, the assignment of counselor devices to open conversations may be based on the respective dynamic priority numbers of each conversation. The dynamic priority numbers assign a unique priority to each queued conversation, and can take any appropriate form, such as, for example, an alphanumeric sequence (e.g., 1, 2, 3, 4, etc.). The queue management module may instruct the communications module to assign the available counselor device to the open conversation having the dynamic priority number that indicates the highest priority at the time. The queue management module may then remove the now-assigned conversation from the queue.

The queue management module may further be configured to update the dynamic priority numbers of the queued conversations in accordance with a risk level determination communicated by the risk assessment module. As discussed herein, each open conversation may be associated with a corresponding risk level, as determined by the risk assessment module based on the associated e-coms of the conversation. The queue management module may be further configured such that, as the risk level determinations are updated to reflect real-time or substantially real-time risk assessment for the queued conversations, the queue management module correspondingly updates the dynamic priority numbers associated with those queued conversations. In this manner, the conversations with the highest associated risk levels are assigned to the available counselors in priority order.

In some embodiments, to the extent two or more conversations have equal or substantially equal risk levels, the queue management module may be further configured to query the database to determine an order in which the conversations were opened, e.g., via the initial e-com timestamp. The queue management module may then assign respective dynamic priority numbers to otherwise equal risk level conversations in accordance with a temporal priority of those equal risk level conversations.

Figure 3B:
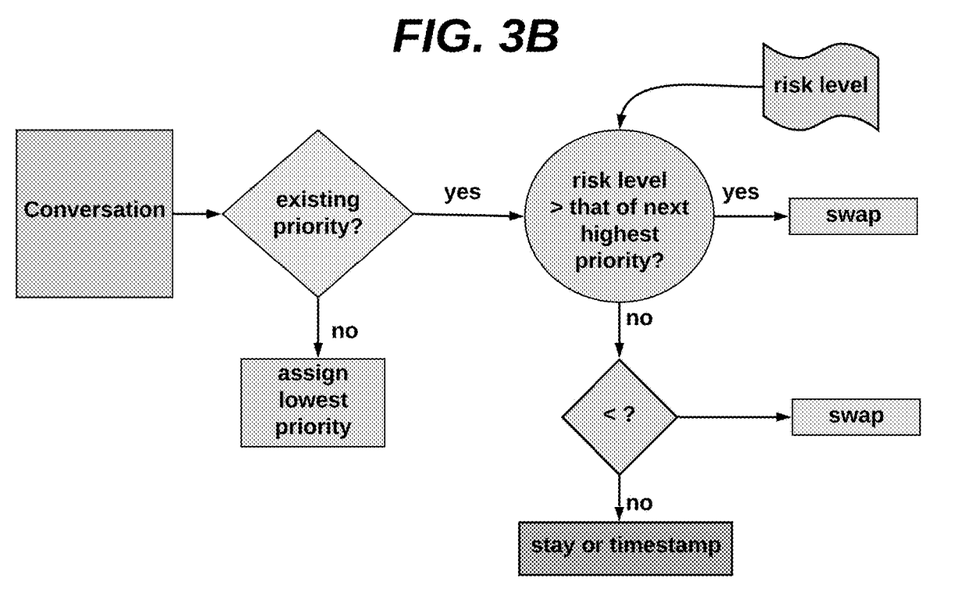
FIG. 3B schematically illustrates an exemplary operation in accordance with one or more aspects of the invention.
Figure 3C:
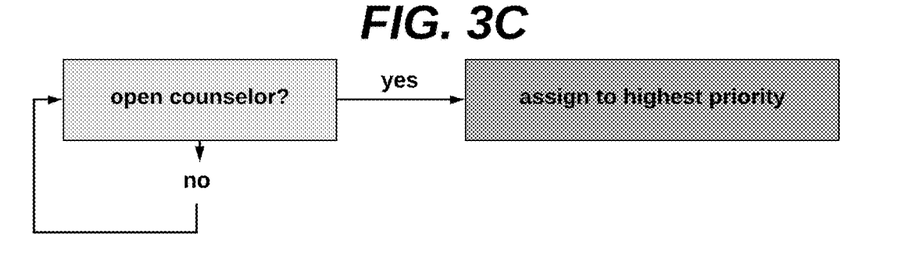
FIG. 3C schematically illustrates an exemplary operation in accordance with one or more aspects of the invention.

Turning now to FIG. 3B, in exemplary operation, the queue management module may consider updating the dynamic priority numbers of the queued conversations—and thereby re-prioritizing the queued conversations. Accordingly, it may be considered whether a conversation has an assigned dynamic priority number. If not, a lowest available priority number may be assigned to the considered conversation. If so, or after assignment of the lowest available priority number, the risk level of the considered conversation may be received from the risk assessment module and may be compared to the risk level of the queued conversation having the next highest priority number. If the considered conversation has a higher risk level than that of the queued conversation with the next highest priority number, the queue management module may reassign the respective priority numbers so that they are swapped between the two conversations. If the considered conversation does not have a higher risk level than that of the queued conversation with the next highest priority number, it may be further considered whether the considered conversation has a lower risk level than that of the queued conversation with the next lowest priority number. If so, the respective priority numbers may be swapped. If not, then the priority numbers may remain as-is, or a timestamp priority may be similarly implemented.

The consideration of whether to update priority numbers of the queued conversations may be made periodically, on-demand, and/or on the occurrence of a triggering event. For example, the consideration of whether to update the priority number of a conversation may occur in response to a change in the risk level of the conversation, or as part of a periodic audit, or on-demand.

In at least one embodiment, the queue management module is configured to receive instructions from one or more counselor devices for updating the priority numbers. In this manner, counselors and/or administrators may actively control conversation priority. Such active control may supersede the automated queue management based on determined risk level.

The auto-response module is configured to receive e-coms routed from the user device, and to, in response, generate and send automated reply e-coms to the user device. The auto-response module may generate and send e-coms that: welcome the user to the crisis line service; explain how the crisis line service works; provide terms of service, privacy and/or other policies; gather identifying information and/or information about the crisis; provide registration information; prompt participation in a survey; provide a closing e-com when the conversation is closed; and the like.

The auto-response module may be further configured to generate and send automated e-coms to counselor devices. The auto-response module may generate and send e-coms that: remind the counselor to perform some action item, guide the counselor in responding to the user, or provide other useful information to the counselor.

The risk assessment module is configured to determine a risk level for conversations based on respective e-coms thereof. The risk assessment module is generally comprised of an ensemble of deep neural networks trained to predict the risk of suicide and other physical or psychological harm based on an analysis of the current conversation being analyzed for risk. The risk assessment module may utilize artificial intelligence and machine learning in operation.

The risk assessment module may be configured to recognize the content of e-coms text (i.e., text and/or voice messages) according to known methodologies. In exemplary operation, e-coms are processed via text/voice recognition and natural language processing. The risk assessment module may be trained from all previous feedback by crisis counselors in surveys taken post-conversations as well as by reading variability in sentences and understanding context, including identifying high-risk words and word combinations. The risk assessment module may therefore be trained to determine the risk level by considering the content of the e-com in the context of the conversation as a whole. Moreover, the risk assessment module may consider the e-com content of users and/or counselors in determining risk level.

The risk assessment module may further be configured to store the determined risk level in the database in association with the conversation to which it pertains. In this manner, each conversation is updated in real-time to reflect the most current risk level associated with the conversation.

Figure 5:
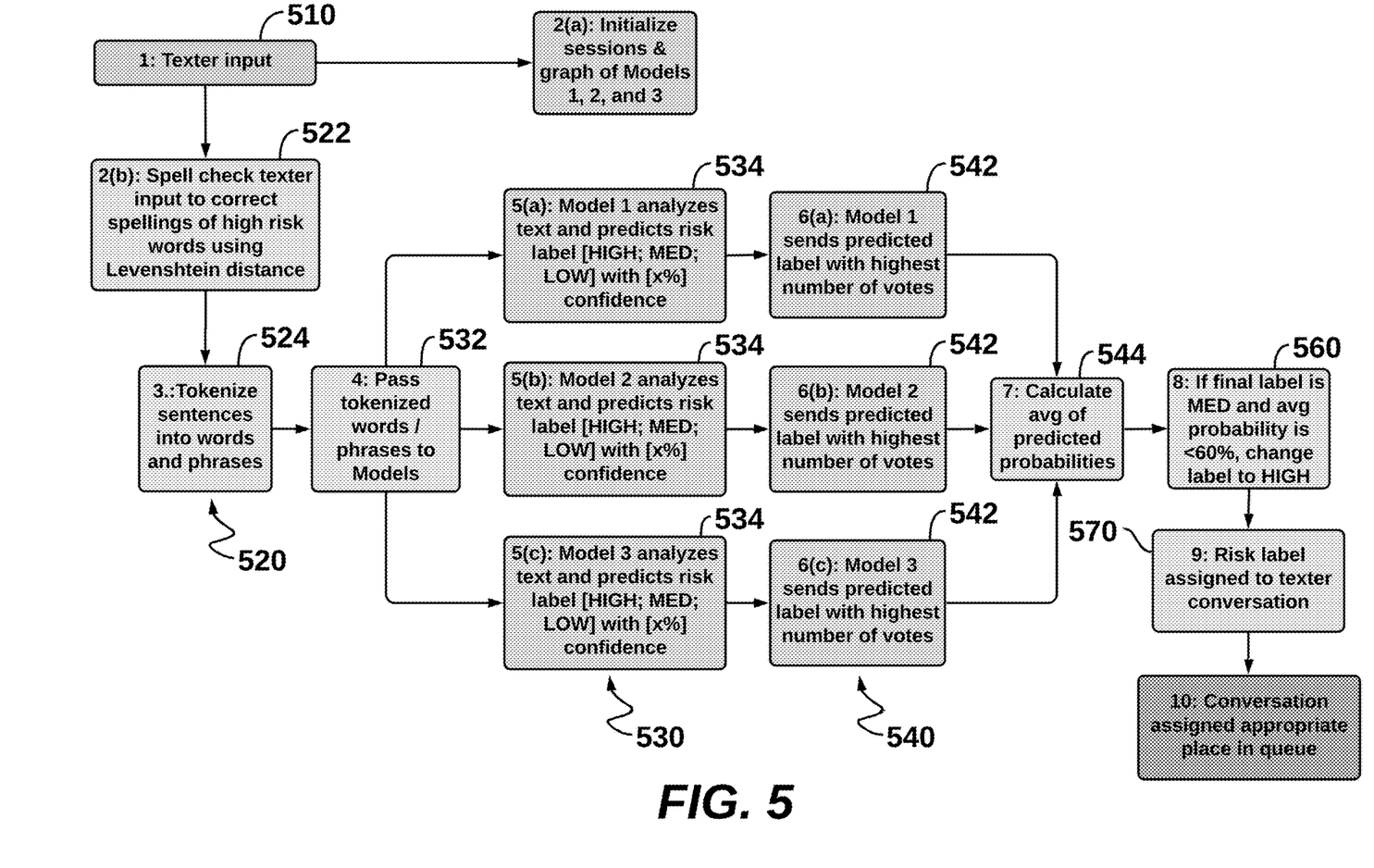
FIG. 5 schematically illustrates an exemplary operation in accordance with one or more aspects of the invention.

Turning now to FIG. 5, the risk assessment module may utilize a plurality of risk models in determining the risk level for a conversation. In at least one embodiment, the plurality of risk models is three risk models. However, additional or fewer models are expressly contemplated.

Each of the models is configured to determine a predicted risk level (e.g., high, medium, low) and an associated confidence level (e.g., a confidence %) in the predicted risk level. In particular, each model determines the confidence level for each of a plurality of predicted risk levels. For example, a model may determine from the e-com a 60% confidence that the risk is high, a 30% confidence that the risk is medium, and a 10% confidence that the risk is low. In at least one embodiment, each model determines risk levels in a different way, e.g., has been trained differently.

The predicted risk level may be determined, in whole or in part, by cross-referencing the content of the conversation with a database of keywords, phrases, messages, conversations, and data associated therewith. The database of keywords may be organized according to a crisis description. Machine learning may be used by the models to analyze content of and the interrelationships between the content of the current conversation, including context.

The risk models may be retrained constantly through the interplay of model predictions and real-time feedback loops from crisis counselors, in accordance with known artificial intelligence training methodologies. For example, ensemble learning may be utilized to progressively improve the risk models.

In at least one embodiment, each of the risk models is a Long Short-Term Memory (LSTM) model. LSTM models are known recurrent neural networks well-suited for sequence predictions. In operation, each LSTM model may be trained via tokenization of e-com input, a plurality of hidden layers, with a plurality of units per layer, and a Relu activation unit.

In at least one embodiment, the risk assessment module comprises three LSTM models. A first LSTM model is a most-conservative model. The first LSTM model preferably comprises: 200,000 tokens, 3 hidden layers, 16 units per layer, and a first Relu activation unit. A second LSTM model is a mid-conservative model. The second LSTM model preferably comprises: 200,000 tokens, 3 hidden layers, 32 units per layer, and a second Relu activation unit. A third LSTM model is a least-conservative model. The third LSTM model preferably comprises: 100,000 tokens, 3 hidden layers, 16 units per layer, and a third Relu activation unit.

The content used to train the models may comprise e-coms submitted and/or received by users to the system. Such e-coms include, for example, e-coms from all the users or subsets thereof (including only the current user whose conversation is being analyzed for risk), and e-coms from active or inactive conversations. As discussed above, these e-coms may be stored in the database and accessed for training the models.

The risk assessment module may be further configured to aggregate the predicted risk labels and associated confidence levels to determine a final risk label. The aggregation may involve, for example, selecting the most frequently-occurring or highest-confidence risk labels and averaging the associated confidence levels.

In addition, the counselors may manually determine and assign a risk level for a conversation based on an assessment of their interaction with the user. The risk assessment module may receive such assigned risk level, which may be utilized as feedback in further training the modules.

In some embodiments, the risk assessment module may be configured to determine the risk level of each conversation (or portion thereof) by applying natural language processing methodologies, including but not limited to: n-grams matching, minimizers, maximizers, and associations between words to test against models generated from the historically determined urgency of previous conversations and their outcomes with the crisis hotline provider. In analyzing e-com content to determine risk levels, the risk assessment module may consider, for example, word choice, speech pattern, tone of voice, delivery speed, frequency and/or quantity of word/phrase usage, etc. The e-com analysis may occur in real-time, or in substantially real-time, as e-coms are added to the analyzed conversation.

In at least one embodiment, the risk assessment module, via the risk models, is configured to determine a predicted crisis type. Exemplary crisis types include but are not limited to: suicidal ideation, self-harm, depression, anxiety, relationship issues, bullying, grief, substance abuse, gender identity crises, or any other psychological or emotional crisis being experienced by the user. The predicted risk type may be aggregated in determining a final risk type, similarly to the predicted risk level.

In this manner, a real-time and continuous risk analysis may be provided, which dynamically responds to the progressing conversation. Such analysis may be utilized by the system to, for example: provide alerts and/or suggestions to the counselor and/or supervisors, initiate intervention by emergency services, etc.

As shown in FIG. 5, an exemplary operation of the risk assessment begins at step 510, with one or more e-coms associated with a conversation being provided to the risk assessment module for the determination of a risk level of the conversation.

At step 520, text identification and natural language processing techniques may be utilized to determine the content of the text of the e-com(s) and generate input content therefrom. For example, spell-checking 522 and tokenization 524 of words and phrases may be undertaken to determine the content of the text and generate the input content. The input content is content that reflects the meaning of the text and is formatted to be accepted by the risk models.

At step 530, the input content is provided 532 to each of the plurality of risk models 534, each of which in turn determines a predicted risk level (e.g., high, medium, low)

and an associated confidence level (e.g., a confidence %) in the predicted risk level. In particular, each model determines the confidence level for each of a plurality of predicted risk levels. For example, a model may determine from the e-com a 60% confidence that the risk is high, a 30% confidence that the risk is medium, and a 10% confidence that the risk is low.

It will be understood that the determination of the predicted risk levels and confidence levels may take into account the historical text content of the conversation. For example, the historical progression of word choice or the repetition of concepts may influence predicted risk levels and/or confidence levels.

At step 540, for each model, the predicted risk level with the highest confidence level is selected 542, and the selected predicted risk labels and associated confidence levels are aggregated 544 to determine a final risk label. The aggregation may involve, for example, selecting the most frequently-occurring or highest confidence risk label and averaging the associated confidence levels.

In at least one embodiment, at step 560, the risk level of the conversation may be increased from an initial determined risk level to a final determined risk level, based on the associated confidence level meeting, exceeding or falling below a respective confidence threshold. For example, a conversation with an initial determined risk level of medium and an associated confidence level that exceeds 60% may be reclassified as a high risk level. As another example, a conversation with an initial determined risk level of medium and an associated confidence level that falls below 30% may be reclassified as a low risk level. As such, the system may be configured to reclassify initial determined risk levels to avoid under-prioritizing or over-prioritizing.

At step 570, the final risk level is assigned to the associated conversation via updating the risk level indicator to reflect the determined final risk level. Further updates to the risk level of the conversation may be made as further e-coms associated with the conversation are considered. Accordingly, risk assessment may be done for the conversations as respective e-coms are received by the system.

Figure 6:
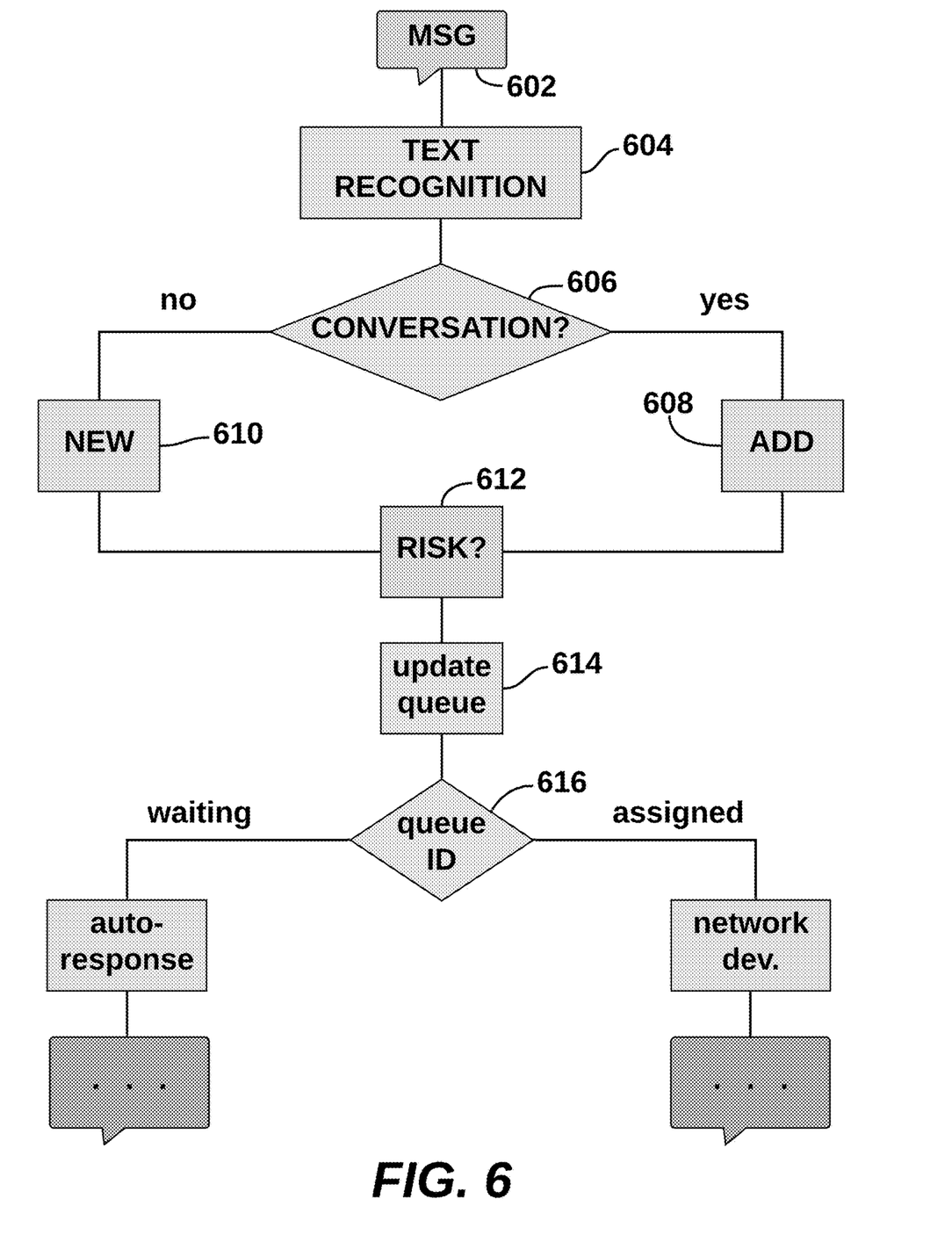
FIG. 6 schematically illustrates an exemplary method in accordance with one or more aspects of the invention.

FIG. 6 schematically illustrates an operation of the system according to at least one aspect of the invention.

At block 602, the communications module receives an incoming e-com from a user device. At block 604, the e-com is text-recognized by the communications module.

At block 606, the communications module determines whether the user device is associated with an open conversation. If so, the communications module associates the incoming e-com with the open conversation at block 608. If not, the communications module starts a new conversation and associates the incoming e-com with the new conversation at block 610.

At block 612, the risk assessment module determines the risk level for the conversation associated with the e-com. The determined risk level is then associated with the conversation. At block 614, the queue management module adjusts the dynamic priority number of the conversation based on the associated risk level.

At block 616, the system queries the conversations so as to assign one or more conversations to available counselors, or otherwise provide auto-responses to still queued conversations, as discussed herein.

In some embodiments, the system may also include supervisor devices, which are substantially counselor devices with additional access and features. Each supervisor device may be selectively assigned to one or more counselor devices. When a counselor device receives or sends e-coms, duplicate e-coms may be provided to the associated supervisor device as viewable/accessible information. The counselor devices and supervisor devices may further be configured to communicate directly and/or in groups.

Moreover, it will be understood that each of the counselor devices and supervisor devices includes a user interface, as is generally known in the art, which allows the counselor/supervisor to interact with the system, including but not limited to: providing system instructions, creating and managing e-coms, and communicating with other devices. For example, the user interface may include a "flag" button associated with the conversation or individual e-coms. Selecting the "flag" button may send an "imminent risk" action item to be sent to the supervisor device, thereby causing an "imminent risk" indicator to be displayed on the interface of the supervisor device.

The supervisor device may then be used to appropriately respond to the action item, including canceling the action item, or initiating an "active rescue" alert whereby first responders are contacted and directed to the location of the user device. It will be understood, however, that other responses may also be had.

In this manner, users contacting the system may be provided with a counselor according to their risk level—and thus crisis management may be triaged.

The embodiments described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In addition, while the term "text message" has been used in the description of embodiments of the present application, the application may be applied to many types of network data. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, in accordance with the practices of persons skilled in the art, the invention is described herein with reference to operations performed by a computer system or a like electronic system. Such operations may be understood as being computer-executed. It will be appreciated that the operations that are symbolically represented (e.g., as modules or the like) include manipulation by a processor, such as a central processing unit, of electrical signals representing data bits and the maintenance of data bits at memory locations, such as in a system memory, as well as other processing of signals. The memory locations where data bits are maintained are physical locations that have particular electrical, magnetic, optical, or organic properties corresponding to data bits.

The operations and functions described herein may be implemented via hardware, software, firmware, or any combination thereof, unless expressly indicated otherwise. If implemented in software, aspects of the invention may be stored as instructions on a computer readable medium, including any available media accessible by a computer that can be used to store desired program code in the form of instructions, data structures, or the like. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Thus, one or more aspects of the invention may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium, as is known in the art. Further, modules and/or other appropriate means for performing the operations described herein may be utilized in implementing the functionalities described herein.

The scope of this description is to be interpreted only in conjunction with the appended claims and it is made clear, here, that the named inventor believes that the claimed subject matter is what is intended to be patented.

What is claimed is:

1. A system for automated triaging of electronic communications, comprising:
    at plurality of user devices, each user device configured to generate, receive and transmit electronic messages;
    at least one counselor device, each counselor device configured to generate, receive and transmit electronic messages; and
    a server system, the server system including a plurality of risk engines, each configured to individually predict a risk level with a confidence value, the server system configured to:
        receive a plurality of electronic messages from the user devices,
        associate electronic messages with respective conversations, each conversation having an associated user device and one or more associated electronic messages,
        determine content of the electronic messages of each conversation,
        calculate a risk score for each conversation based on the determined content of the associated electronic messages, wherein calculating the risk score includes aggregating the predicted risk levels and confidence values so as to generate an aggregated risk level and an aggregated confidence value,
        assign a priority to each conversation based on the risk score for the conversation,
        associate counselor devices with conversations based on the priority assigned to the conversation.

2. The system of claim 1, wherein the server system is further configured to:
    dynamically update one or more of the risk scores based on newly received electronic messages.

3. The system of claim 1, wherein the server system is further configured to:
    determine open conversations, wherein open conversations are conversations that are not associated with counselor devices; and
    maintain a queue of open conversations based on the risk scores for each open conversation.

4. The system of claim 3, wherein the server system is further configured to:
    dynamically update one or more of the risk scores based on newly received electronic messages.

5. The system of claim 1, wherein the server system is further configured to:
    determine open conversations, wherein open conversations are conversations that are not associated with counselor devices; and
    maintain a queue of open conversations based on the risk scores for each open conversation.

6. The system of claim 1, wherein the server system is further configured to:
    dynamically update one or more of the risk scores based on newly received electronic messages.

7. The system of claim 1, wherein calculation of the risk score includes adjusting the aggregated risk level based on whether the aggregated confidence level meets, exceeds and/or is below one or more confidence thresholds.

8. The system of claim 7, wherein the server system is further configured to:
    determine open conversations, wherein open conversations are conversations that are not associated with counselor devices; and
    maintain a queue of open conversations based on the risk scores for each open conversation.

9. The system of claim 7, wherein the server system is further configured to:
dynamically update one or more of the risk scores based on newly received electronic messages.

10. A method for automated triaging of electronic communications within a server system that associates user devices with counselor devices, the server system including a plurality of risk engines, each configured to individually predict a risk level with a confidence value, the method comprising:
receiving a plurality of electronic messages from the user devices,
associating electronic messages with respective conversations, each conversation having an associated user device and one or more associated electronic messages,
determining content of the electronic messages of each conversation,
calculating a risk score for each conversation based on the determined content of the associated electronic messages, wherein calculating the risk score includes aggregating the predicted risk levels and confidence values so as to generate an aggregated risk level and an aggregated confidence value,
assigning a priority to each conversation based on the risk score for the conversation,
associating counselor devices with conversations based on the priority assigned to the conversation.

11. The method of claim 10, further comprising:
dynamically updating one or more of the risk scores based on newly received electronic messages.

12. The method of claim 10, further comprising:
determining open conversations, wherein open conversations are conversations that are not associated with counselor devices; and
maintaining a queue of open conversations based on the risk scores for each open conversation.

13. The method of claim 12, further comprising:
dynamically updating one or more of the risk scores based on newly received electronic messages.

14. The method of claim 10, further comprising:
determining open conversations, wherein open conversations are conversations that are not associated with counselor devices; and
maintaining a queue of open conversations based on the risk scores for each open conversation.

15. The method of claim 10, further comprising:
dynamically updating one or more of the risk scores based on newly received electronic messages.

16. The method of claim 10, wherein calculation of the risk score includes adjusting the aggregated risk level based on whether the aggregated confidence level meets, exceeds and/or is below one or more confidence thresholds.

17. The method of claim 16, further comprising:
determining open conversations, wherein open conversations are conversations that are not associated with counselor devices; and
maintaining a queue of open conversations based on the risk scores for each open conversation.

18. The system of claim 16, wherein the server system is further configured to:
dynamically update one or more of the risk scores based on newly received electronic messages.

\* \* \* \* \*